(12) United States Patent  (10) Patent No.: US 8,175,016 B1
Basu et al.  (45) Date of Patent: May 8, 2012

(54) SYSTEMS, METHODS AND COMPUTER READABLE MEDIA FOR ENERGY CONSERVATION IN SENSOR NETWORKS

(75) Inventors: Prithwish Basu, Cambridge, MA (US); Jason Keith Redi, Belmont, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 1225 days.

(21) Appl. No.: 10/804,190

(22) Filed: Mar. 19, 2004

(51) Int. Cl.
  *G08C 17/00* (2006.01)
  *H04B 7/185* (2006.01)
  *H04B 7/00* (2006.01)
  *H04B 1/38* (2006.01)
  *H04L 12/26* (2006.01)

(52) U.S. Cl. ........ 370/311; 370/318; 370/252; 455/522; 455/574

(58) Field of Classification Search ........................ None
  See application file for complete search history.

(56) References Cited

U.S. PATENT DOCUMENTS

| | | | | | |
|---|---|---|---|---|---|
| 5,056,085 | A | * | 10/1991 | Vu | 370/400 |
| 5,574,982 | A | * | 11/1996 | Almgren et al. | 455/69 |
| 5,887,245 | A | * | 3/1999 | Lindroth et al. | 455/69 |
| 6,449,462 | B1 | * | 9/2002 | Gunnarsson et al. | 455/67.13 |
| 2002/0010001 | A1 | * | 1/2002 | Dahlman et al. | 455/522 |
| 2002/0172186 | A1 | * | 11/2002 | Larsson | 370/349 |
| 2002/0198015 | A1 | * | 12/2002 | Becker et al. | 455/522 |
| 2003/0063585 | A1 | * | 4/2003 | Younis et al. | 370/331 |
| 2004/0100927 | A1 | * | 5/2004 | Black et al. | 370/335 |
| 2004/0142716 | A1 | * | 7/2004 | Orlik et al. | 455/522 |
| 2006/0128349 | A1 | * | 6/2006 | Yoon | 455/343.2 |
| 2006/0245398 | A1 | * | 11/2006 | Li et al. | 370/335 |
| 2007/0099678 | A1 | * | 5/2007 | Kim et al. | 455/574 |
| 2008/0037485 | A1 | * | 2/2008 | Osinga et al. | 370/338 |

OTHER PUBLICATIONS

Kang et al. "A comparison of Power-Efficient Broadcast Routing Algorithms", 0-7803-7974-8/03 © 2003 IEEE , p. 387-392.*
I. Chlamtac, C. Petrioti, and J. Redi. "Energy-conserving Access Protocols for Identification Networks". *IEEE Transactions on Networking*, 7(1):51-59, Feb. 1999.
T. Clausen, P. Jacquet. Optimized Link State Routing Protocol. RFC 3626 (Experimental), Oct. 2003. http: //www. ietf.org/rfc/rfc3626.txt.
T. H. Cormen, C. E. Leiserson, and R. L. Rivest. *Introduction to Algorithms*. MIT Press and McGraw-Hill, 1990.
D. Cutler, J. Hill, P. Buonadonna, R. Szewczyk, and A. Woo. *A Network-Centric Approach to Embedded Software for Tiny Devices*. Technical Report IRB-TR-01-001, Intel-Research, Berkeley, CA, Jan. 2001.
J. Edmonds. "Optimum Branchings". *Journal of Research of the National Bureau of Standards*, 71B:233-240, 1967.
D. Estrin, R. Govindan, J. Heidemann, and S. Kumar. "Next Century Challenges: Scalable Coordination in Sensor Networks". In *Proc. International Conference on Mobile Computing and Networking* (*MobiCom*), Seattle, WA, Aug. 1999.

(Continued)

*Primary Examiner* — Warner Wong

(57) ABSTRACT

Systems, methods and computer readable media consistent with the present invention address this and other needs by providing mechanisms for minimizing an energy cost within a wireless network having a plurality of nodes, including a plurality of transmitting nodes and a plurality of receiving nodes. An energy cost, including at least an overhearing cost, is determined. A transmission power assignment of a transmitting node is then adjusted to reduce the energy cost. These determining and adjusting stages are repeated to reduce the energy cost.

35 Claims, 14 Drawing Sheets

OTHER PUBLICATIONS

W. Helnzelman, A. Chandrakasan, and H. Balakrishnan. "Energy-Efficient Communication Protocols for Wireless Microsensor Networks". In *Hawaiian International Conference on Systems Science (HICSS)*, Hawaii, Jan. 2000.

O. Kasten. Energy Consumption. URL. http://www.inf.ethz.ch/~kasten/research/bathtub/energy_consumption.html%.

S. Madden, M. J. Franklin, J. M. Hellerstein, and W. Hong. "TAG: A Tiny Aggregation Service for Ad-Hoc Sensor Networks". In *Proc. Symposium on Operating Systems Design and Implementation (OSDI)*, Dec. 2002.

R. Ogier, F. Templin, and M. Lewis. Topology Dissemination Based on Reverse-Path Forwarding (TBRPF). RFC 3684 (Experimental), Feb. 2004. http://www.ietf.org/rfc/rfc3684.txt.

C. Santivanez, S. Ramanathan, and I. Stavrakakis. "Making Link State Routing Scale for Ad Hoc Networks". In *Proc. ACM MobiHoc*, Long Beach, CA, Oct. 2001.

E. Shih, P. Bahl, and M. J. Sinclair. "Wake on Wireless: An Event Driven Energy Saving Strategy for Battery Operated Devices". In *Proc. International Conference on Mobile Computing and Networking (MobiCom)*, Atlanta, GA, Sep. 2002.

S. Singh and C. S. Raghavendra. "PAMAS—Power Aware Multi-Access Protocol with Signaling for Ad Hoc Networks". *ACM SIGCOMM Computer Communication Review*, 28(3): Jul. 5-26, 1998.

J. M. Steele. "Growth Rates of Euclidean Minimal Spanning Trees with Power Weighted Edges". *The Annals of Probability*, 16(4): 1767-1787, 1988.

J. E. Wieselthier, G. D. Nguyen, and A. Ephremides, "On the Construction of Energy-efficient Broadcast and Multicast Trees in Wireless Networks," In Proc. IEEE Infocom, pp. 585-594, Tel Aviv, Israel, Mar. 2000.

W. Ye, J. Heidemann, and D. Estrin, "An Energy-Efficient MAC Protocol for Wireless Sensor Networks," In Proc. IEEE Infocom, New York, Jun. 2002.

J. Zhao, R. Govindan, and D. Estrin, "Computing Aggregates for Monitoring Wireless Sensor Networks," In Proc. IEEE International Workshop on Sensor Network Protocols and Applications, Anchorage, AK, May 2003.

P. Basu and J. Redi, "Effect of Overhearing Transmissions on Energy Efficiency in Dense Sensor Networks," *Proc. Third International Symposium on Information Processing in Sensor Networks*, Berkeley, California, (forthcoming) Apr. 2004.

M. Cagalj, J.-P. Hubaux, and C. Enz, "Energy-efficient Broadcasting in All-wireless Networks," *ACM/Kluwer Journal of Mobile Networks and Applications (MONET)*, Apr. 2003.

R. Tarjan, "Finding Optimum Branchings," *Networks*, 7(1): 25-35, Spring 1977.

\* cited by examiner

US 8,175,016 B1

SYSTEMS, METHODS AND COMPUTER READABLE MEDIA FOR ENERGY CONSERVATION IN SENSOR NETWORKS

STATEMENT REGARDING FEDERALLY SPONSORED RESEARCH OR DEVELOPMENT

This invention was made with Government support under Contract No. DAAD19-01-2-0011, awarded by the U.S. Army Research Laboratory (ARL). The Government has certain rights in this invention.

INCORPORATION BY REFERENCE

The present invention is the subject of our paper, "Effect of Overhearing Transmissions on Energy Efficiency in Dense Sensor Networks," *Proc. Third International Symposium on Information Processing in Sensor Networks*, Berkeley, Calif., (forthcoming) April 2004, which is hereby incorporated by reference in its entirety.

TECHNICAL FIELD

The present invention relates to wireless networks and, more particularly, to low-power wireless sensor networks.

BACKGROUND

Explosive growth in embedded computing and rapid advances in low power wireless networking technologies are fueling the development of wireless sensor networks. These dynamic and adaptive distributed systems have applications ranging from wildlife habitat monitoring, inventory management, data collection and military and space applications.

Sensor networks are composed of low-power sensor nodes capable of sensing particular physical phenomena and communicating among themselves using wireless transceivers. The nodes are usually powered by batteries. Due to the large number of nodes, their low cost, and the amount of time they are expected to be deployed in a potentially inaccessible area (without provision for recharging the batteries), energy-efficiency becomes perhaps the most important design criteria for sensor networking protocols.

Under the traditional energy model, a static sensor network can be represented by a set of nodes V with each sensor node possessing a geographical position attribute. The transmission energy, $E_{uv}^{xmit}$, required to transmit a bit of data from a node u to a node v over the wireless channel is dependent upon the RF propagation path loss suffered over the distance $d_{uv}$ between them:

$$E_{uv}^{xmit} = E_{tx\text{-}elec} + \epsilon_{amp} d_{uv}^{\alpha}; \alpha = 2 \qquad (1)$$

where $\alpha$ is the path loss exponent and is dependent on the propagation channel and environmental conditions; $E_{tx\text{-}elec}$ is the energy expenditure in the transmitter electronics (per bit); and $\epsilon_{amp}$ is a constant that is characteristic of the amplifier in the transmitter.

The reception energy $E_{uv}^{rcv}$ required to receive a bit of data at the receiver is simply the energy expenditure in the receiver electronics (per bit):

$$E_{uv}^{rcv} = E_{rx\text{-}elec} \qquad (2)$$

A majority of sensor applications involve data gathering and dissemination; hence, energy efficient mechanisms for providing these services become critical.

In data dissemination (or broadcasting), a transmission from one node is propagated throughout the network by the other sensor transceivers. In order to consume the minimum amount of energy for broadcasting a bit of data to all nodes in the network, it is necessary to minimize both the number and energy of these transmissions. Dissemination in wireless networks is distinguished from dissemination in the point-to-point counterpart because wireless channels have inherent broadcast capability. Wieselthier et al. coined the term "wireless multicast advantage" (WMA) for this phenomenon and developed energy-efficient protocols which exploit the WMA. See J. E. Wieselthier, G. D. Nguyen, and A. Ephremides, "On the Construction of Energy-efficient Broadcast and Multicast Trees in Wireless Networks," *Proc. IEEE INFOCOM*, pp. 585-594, Tel Aviv, Israel, March 2000, which is hereby incorporated by reference in its entirety.

In data gathering, sensor networks can be classified into two categories: (1) query-driven and (2) event-driven. For the query-driven case, a user submits a query from a base station node which is then propagated through the network by the sensor transceivers. Sensors that can satisfy the query respond to the originator by means of unicast communications which are propagated back to the base station in the same manner. In an event-driven system, each sensor sends data to the base station whenever it detects a certain event. This triggered mechanism can be thought of as a response to a longstanding query about that event.

Since sending data along individual unicast paths from multiple sensors to the base station is costly in terms of energy expenditure, researchers have proposed mechanisms to aggregate upstream data as it propagates through the network. Essentially, the sensed data flows back to the base station along the edges of a spanning tree which is constructed during the query dissemination phase. Such trees are referred to as routing trees or gradients. In this context, the principal mechanism of energy minimization is the suppression of redundant data packets in the network. See S. Madden, M. J. Franklin, J. M. Hellerstein, and W. Hong, "TAG: a Tiny Aggregation Service for Ad-Hoc Sensor Networks," *Proc. Symposium on Operating Systems Design and Implementation (OSDI)*, December 2002; and J. Zhao, R. Govindan, and D. Estrin, "Computing Aggregates for Monitoring Wireless Sensor Networks," *Proc. IEEE International Workshop on Sensor Network Protocols and Applications*, Anchorage, Ak., May 2003, both of which are hereby incorporated by reference in their entirety. Data fusion and decision fusion techniques combine aggregation mechanisms with in-network processing of sensor data in order to further conserve energy.

The ability to modify transmit power in sensors provides another powerful tool for minimizing energy in both data gathering and dissemination and is a feature of numerous new sensor systems, such as the ARL sensor radio. See R. Tobin, "US Army's BLUE Radio," *Proc. SPIE, Unattended Ground Sensor Technologies and Applications V*, volume 5090, Orlando, Fla., April 2003, which is hereby incorporated by reference in its entirety. With such techniques, each node has the ability to control its transmit power (either arbitrarily or discretely) so that it may control the reach of its broadcast, and thus control how many neighboring nodes are able to receive it.

If arbitrary transmission power control is considered in the traditional energy model, every pair of nodes in the network will have an edge connecting them and the total energy cost, $E_{uv}$, of a bit transmitted along that edge is computed to be the cost due to wireless transmission over a certain distance plus the cost due to reception by the destination radio hardware:

$$E_{uv} = E_{uv}^{xmit} + E_{uv}^{rcv} \qquad (3)$$
$$= E_{rx\text{-}elec} + E_{tx\text{-}elec} + \varepsilon_{amp} d_{uv}^{\alpha}; \alpha \geq 2$$

The energy costs in the traditional model are symmetric, i.e., $E_{uv}=E_{vu}$. Hence, in order to transmit a bit of data from all sensors to a base station node, it was considered to be energy efficient to send and aggregate the data along the edges of an undirected Minimum Energy Spanning Tree (MEST) calculated on the entire network graph.

In the traditional model, the network is represented as a complete graph ("clique") under the assumption of arbitrary power control. If the peak transmission power is fixed and the transmitter is allowed to transmit at discrete power levels only, then the resulting graph may not be a clique, but the edge costs are nevertheless easy to formulate. Once the costs are known, Kruskal's or Prim's algorithm could be used to calculate the undirected MEST in O(e log n) time. See T. H. Cormen, C. E. Leiserson, and R. L. Rivest, *Introduction to Algorithms*. MIT Press and McGraw-Hill, 1990, which is hereby incorporated by reference in its entirety.

For cliques, a complexity of $O(n^2)$ could be achieved using efficient priority queue data structures. Each leaf node in the resulting MEST transmits its data to its parent which aggregates this data with its own and that of other children nodes before transmitting the aggregate to its own parent node. This process continues until the base station receives the complete set of aggregates from its children.

Researchers routinely use the above energy model for modeling energy costs of edges in the network graph. However, the traditional model is inadequate for dense sensor networks. Due to the broadcast nature of the wireless channel, nodes in the vicinity of a sender node overhear its packet transmissions even if they are not an intended recipient. When a certain node u transmits a data packet for node v using optimal transmission power, all nodes x such that the distance $d_{ux} < d_{uv}$ also receive (or overhear) the packet unnecessarily. To illustrate, when node 3 in FIG. 1A forwards its data packet to node 6, its transmission is overheard by nodes 5, 7 and 9. This redundant reception results in unnecessary expenditure of battery energy by the unintended recipients. Hence, the reception energy costs increase. This is especially true for dense networks where each node has several neighbors in close proximity.

Since idle listening on a wireless channel is a significant source of energy consumption, researchers have proposed a multitude of schemes for mitigating this problem. Preamble sampling, Power Aware Multi-Access Protocol with Signaling (PAMAS), and wake-on-wireless are representative of such schemes.

In preamble sampling schemes, a sensor node goes into fine-grained periods of sleep and wakes up periodically to sample the channel, and it remains awake if it sees a preamble transmitted by the sender. However, the receiver may still incur the overhearing energy cost since it must decode the entire packet before ascertaining whether it indeed is an intended recipient of the transmission.

Both PAMAS and wake-on-wireless schemes separate the signaling and data channels to achieve greater power efficiency. In wake-on-wireless, a low-power radio listens to incoming transmissions and wakes up the main radio when it detects a valid incoming packet. Although this technique mitigates the overhearing energy cost in point-to-point transmissions (as in the data gathering case), it is ineffective in the network-wide data dissemination scenario. This is because the low-power radio will always wake up the main radio upon the arrival of a broadcast packet, even if that packet is redundant from a dissemination standpoint. The energy cost of a complete packet reception is greater than the cost of remaining idle and is compounded by the need of the receiver to decode the entire packet before determining whether it is the intended recipient. This can add significant costs to dense sensor networks where a given packet transmission can be overheard by a large number of receivers.

Turning off neighboring radios during a certain point-to-point wireless transmission can mitigate overhearing costs. However, such fine grained scheduling of receiver electronics comes at a high price in terms of hardware complexity and may induce delays in protocol processing at higher layers.

Therefore, there is a need for systems, methods and computer readable media for systematically minimizing the impact of energy cost due to overhearing during data gathering and dissemination.

SUMMARY

Systems, methods and computer readable media consistent with the present invention address these and other needs by providing mechanisms for minimizing an energy cost within a wireless network having a plurality of nodes, including a plurality of transmitting nodes and a plurality of receiving nodes. An energy cost, including at least an overhearing cost, is determined. A transmission power assignment of a transmitting node to is then adjusted to reduce the energy cost. These determining and adjusting stages are repeated to reduce the energy cost.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

FIGS. 11-11C illustrate the energy gain of exemplary embodiments of the present invention (dissemination case) according to different cost models.

DESCRIPTION OF THE EMBODIMENTS

Figure 1B:
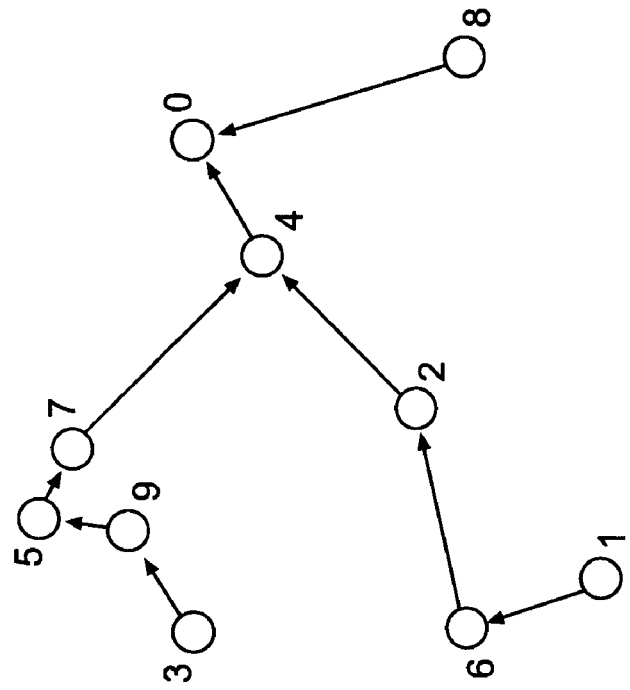
FIG. 1B illustrates a directed Minimum Overhearing Energy Spanning Tree (MOEST) for the same network.

Reference will now be made in detail to exemplary embodiments of the invention, examples of which are illustrated in the accompanying drawings. Wherever possible, the same reference numbers will be used throughout the drawings to refer to the same or like parts.

Systems, methods and computer readable media consistent with the present invention minimize an energy cost of a transmission from a transmitting node u within a wireless network to a receiving node v. Exemplary embodiments of the present invention determine a transmission power assignment that will minimize the energy cost of the transmission, wherein the energy cost includes an overhearing energy cost. Although the present invention is illustrated in terms of a low-power wireless sensor networks, embodiments of the present invention may be used with other types of wireless networks.

In systems, methods and computer readable media consistent with the present invention, the overhearing energy cost (or, simply, the overhearing cost), $E_{uv}^{ov}$, is calculated to be:

$$E_{uv}^{ov} = (N_{uv}^{(ov)} - 1) E_{rx-elec} \quad (4)$$

where $N_{uv}^{(ov)}$ is the number of nodes (inclusive of v) which may receive a transmission from u to v, and $N_{uv}^{(ov)} - 1$ is the set of nodes x which overhear the transmission of the packet from u to v.

In one embodiment, systems, methods and computer readable media consistent with the present invention assume that a sensor's receiver circuitry is always awake and can receive and decode all incoming packets. Since the energy cost of a complete packet reception is greater than the cost of remaining idle, and it is necessary for the receiver to decode the entire packet in order to determine whether it is an intended recipient, the overhearing cost is simply proportional to the number of nodes, $N_{uv}^{(ov)} - 1$, which are in the communicating radius of u when it communicates with v.

In more refined embodiments, systems, methods and computer readable media consistent with the present invention determine which receivers x will actually expend additional energy upon overhearing the communication from u to v. In such embodiments, sensors which are not awake at the time of a given communication or cannot receive and decode the transmitted packet are not counted in $N_{uv}^{(ov)}$. Such embodiments account for, e.g., directionality of broadcast antennas, geography, or mechanisms for intelligent cycling of low-power sensor radios to save energy.

In systems, methods and computer readable media consistent with the present invention, the total energy cost of a transmission from node u to node v ($E_{uv}$) includes at least the overhearing cost. The transmission and reception energy remain as given by the traditional model (Equations 1 and 2 above). Consequently, in exemplary embodiments of the present invention, the total energy cost may be determined by the sum of the transmission, reception and overhearing costs:

$$E_{uv} = E_{uv}^{xmit} + E_{uv}^{rcv} + E_{uv}^{ov} \quad (5)$$
$$= E_{tx-elec} + \varepsilon_{amp} d_{uv}^\alpha + N_{uv}^{(ov)} E_{rx-elec}; \alpha \geq 2$$

However, other energy costs, such as an idle energy cost, may also be included.

Under this model, it can be seen that the overhearing cost of a transmission from node u to node v is not equal to the overhearing cost of a transmission from node v to node u, i.e., $E_{uv}^{ov} \neq E_{vu}^{ov}$, since $N_{uv}^{(ov)}$ is not necessarily equal to $N_{vu}^{(ov)}$. This results in a directed network graph with asymmetric edge costs and, consequently, the undirected MEST algorithms of the traditional model, e.g., Kruskal's and Prim's algorithms, are not applicable.

Figure 2A:
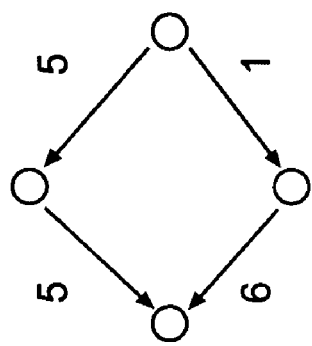
FIG. 2A is a directed graph of a simple network with asymmetric edge costs.
Figure 2B:
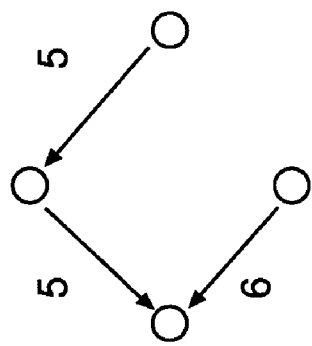
FIG. 2B illustrates a Minimum Energy Spanning Tree (MEST) determined by Prim's algorithm for the directed graph of FIG. 2A.
Figure 2C:
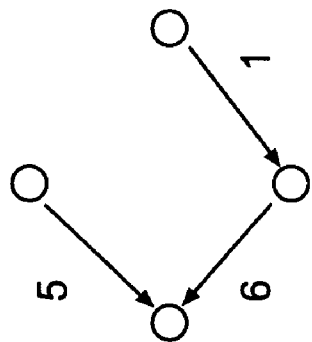
FIG. 2C illustrates the optimal rooted arborescence for the directed graph of FIG. 2A.

To illustrate, FIG. 2A is a directed graph of a simple network with asymmetric edge costs. FIGS. 2B-C show that the MEST achieved by Prim's algorithm (FIG. 2B) does not yield the optimal rooted arborescence (FIG. 2C) that may be achieved with systems and methods consistent with the present invention.

Data Gathering

Systems, methods and computer readable media consistent with the present invention provide mechanisms for minimizing a data gathering energy cost within a wireless network having a plurality of nodes, including a plurality of transmitting nodes and a plurality of receiving nodes, wherein the gathering energy cost includes at least an overhearing cost. Exemplary embodiments of the present invention minimize a gathering energy cost by determining a transmission power assignment that will minimize the total energy cost of the transmission.

Exemplary embodiments of the present invention determine a directed Minimum Overhearing Energy Spanning Tree (MOEST) by determining a directed minimum-cost in-arborescence R rooted at the base station node r such that each node has a valid directed path to the root using the directed edges of R. To determine this arborescence, exemplary embodiments of the invention determine the arborescence R that satisfies the following:

1. The total energy expended for each transmission in the arborescence, $$\sum_{(u,v) \in R} E_{uv},$$

is minimized. $E_{uv}$ may be determined, e.g., by a method that uses Equation 5.
2. R=(V, E) is a directed subgraph of G=(V, V×V) without self-loops and possesses |V|−1 edges.
3. R has exactly one root node r (outdegree(r)=0) and it is connected, i.e., there is exactly one directed path from each node w∈V−{r} to r.

4. Every node w (other than r) has exactly one outgoing edge (representing a transmission towards the parent node in the arborescence). That is, ∀W∈V−{r}:outdegree(w)=1.

Conditions 3 and 4 impose constraints that render the traditional undirected MEST algorithms inapplicable.

Edmonds proposed an efficient algorithm for finding optimum branching (rooted forests) with maximum cost on arbitrary directed graphs. He pointed out that optimal arborescences (rooted trees) can be computed with very minor modifications to the branching algorithm if the directed graph is strongly connected. See J. Edmonds, "Optimum Branchings," *Journal of Research of The National Bureau of Standards*, 71B: 233-240, 1967, which is hereby incorporated by reference in its entirety. Tarjan proposed an efficient implementation of Edmond's branching algorithm in min {O(e log n),O(n²)} time using efficient priority queue and set union/find primitives. See R. Tarjan, "Finding Optimum Branchings," *Networks*, 7(1): 25-35, Spring 1977, which is hereby incorporated by reference in its entirety.

Exemplary embodiments of the present invention modify these known algorithms to determine the minimum-cost in-arborescence instead of the maximum-cost out-arborescence that was determined by both Tarjan and Edmonds.

Figure 3:
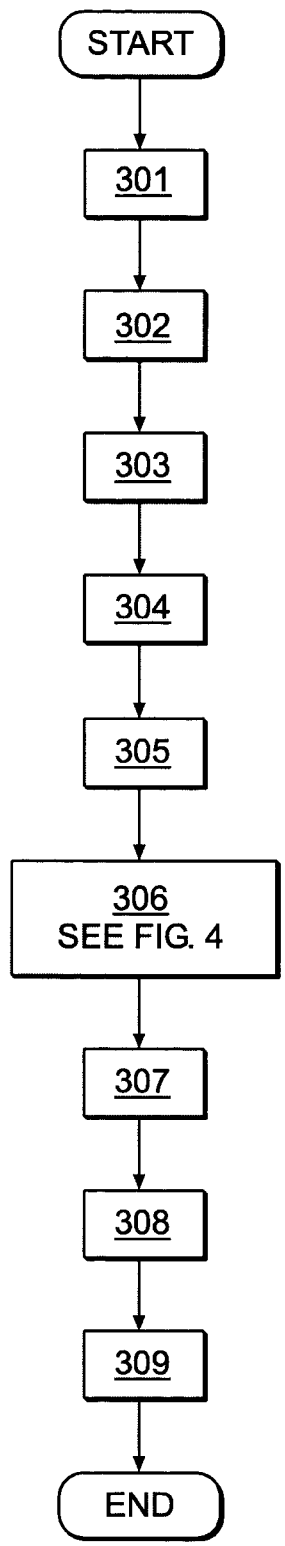
FIG. 3 is a flow chart that illustrates an exemplary method of minimizing total gathering energy.

FIG. 3 is a flow diagram which illustrates an exemplary method of minimizing total gathering energy consistent with the present invention.

At 301, a set of sensor nodes, including a root node r (signifying the base station), is defined. The set may be defined by the coordinates of the nodes in space (in either two or three dimensions). Advantageously, the set of nodes may also be defined in time, e.g., to account for intelligent cycling of low-power sensor radios to save energy.

At 302, a complete graph G consisting of the set of nodes and directed edges between every pair of nodes is constructed. The total energy cost for each directed edge in the network graph is determined and assigned. Systems, methods and computer readable media consistent with the present invention incorporate an overhearing cost when assigning a total energy cost, although other factors may be included. In exemplary embodiments of the present invention, the total energy cost is determined by a method using Equation 5 above.

At 303, a subgraph G(H) is initialized, where H denotes a set of nodes in G with an empty edge set.

At 304, graph G is modified by reversing the direction of all edges and replacing the original energy cost of each edge with its negative value. This is done in order to be able to use a known cost algorithm which is configured to determine a maximum-cost out-arborescence, e.g., Tarjan's algorithm, to instead determine a minimum-cost in-arborescence.

At 305, all incoming edges of the root node r are removed. This is done because, in data gathering, the root node r does not transmit data, but only gathers it.

Figure 4:
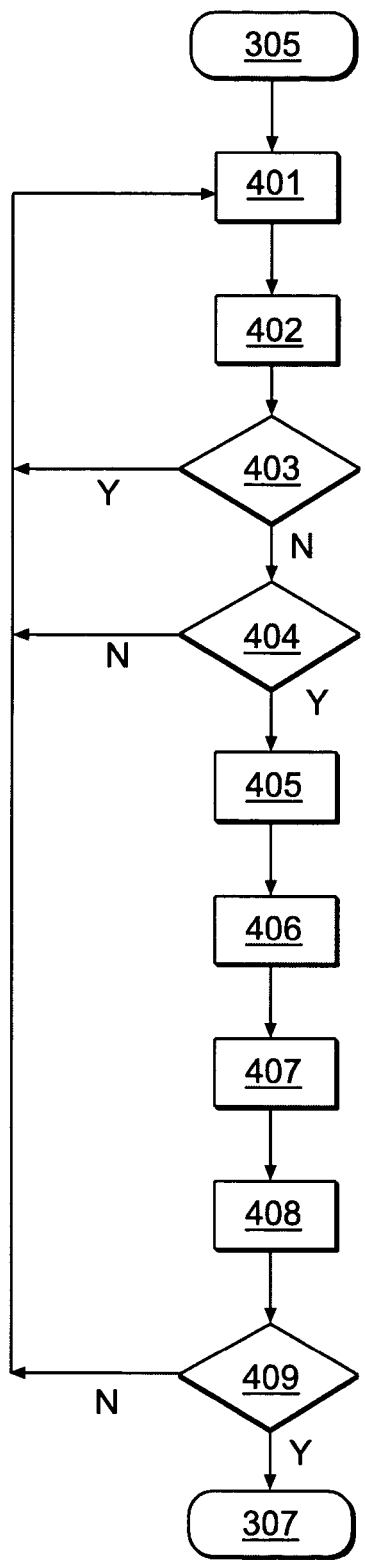
FIG. 4 is a flow chart that illustrates an exemplary cost algorithm.

At 306, the modified graph G is processed using the cost algorithm, e.g., Tarjan's algorithm, to determine the maximum-cost out-arborescence. A more detailed method for determining the maximum-cost out-arborescence is shown in FIG. 4. There are N(N−1) directed edges in the complete graph G. The arborescence R will have only N−1 directed edges. Consequently, the cost algorithm is used to eliminate edges until an arborescence R is found such that the network remains connected.

Processing then continues with reference to FIG. 4. Although FIG. 4 illustrates Tarjan's algorithm, which is presently preferred as the cost algorithm, the present invention is not limited to any particular cost algorithm, and one of ordinary skill will recognize that other suitable cost algorithms may be employed.

At 401, Tarjan's algorithm is begun by choosing a root component S. in subgraph G(H). A root component is one which does not have any edges coming into any inside node from outside nodes; i.e., if S is such that no edge $(u_1, u_2) \in H$ satisfies $u_2 \in S$ and $u_1 \in V-S$, then S is a root component of G(H).

At 402, the max-weight incoming edge $e=(u,v) \in V \times V$ incoming into S is selected. Nodes u and v are the source and target nodes of edge e.

At 403, it is determined if $u \in S$. If so, edge e is discarded and processing returns to 401; otherwise processing continues to 404.

At 404, it is determined if u and v belong to the same weakly connected component of G(H). If u and v do not belong to the same weakly connected component of G(H), edge e is added to H (thus growing the arborescence) and processing returns to 401; otherwise processing continues to 405.

At 405, the sequence $\{S_i,(x_i,y_i), \ldots\}_{i=1}^{k}$ of strongly connected components $S_i$ and edges $(x_i,y_i) \in H$; $y_i \in S_i, x_i \in S_{i+1}$, $S_k = S$, $(x_k,y_k)=(u,v)$, $x_k \in S_1$ is found. Essentially, backtracking from (u,v), a chain of strongly connected components ending at (u,v) is found.

At 406, the min-cost edge $(x_j,y_j)$ in the sequence $(x_i,y_i)$ is found.

At 407, the cost of unexamined edges of the form $(x,y), y \in S_i$ is redefined as follows: $c(x,y):=c(x,y)-c(x_i,y_i)+c(x_j,y_j)$.

At 408, (u,v) is added to H, thus combining the strongly connected components $S_i$ into one strongly connected component and growing the arborescence.

At 409, it is determined if all of the nodes in the graph G have been selected. If not, processing returns to 401; otherwise processing continues to 307. See FIG. 3.

At 307, the shortest path tree T on H rooted at r is found.

At 308, the directions of the edges in T are reversed and the original positive costs are restored. R is the resultant minimum cost gathering arborescence.

At 309, the transmission power assignment ($E_{tx-elec}$) for each node in R is determined. In exemplary embodiments of the present invention, the transmission power assignment is determined by a method using Equation 5 above.

The above algorithm may advantageously be implemented using efficient data structures such as priority queues. Since there are ? edges in G, the time complexity is $O(n^2)$.

Data Gathering Results

MEST and MOEST were compared for simulated two dimensional sensor networks of various sizes at different node densities and distributions. The results of the comparison are presented below. The radio parameters used for these simulations are listed in Table 1.

TABLE 1

RADIO SIMULATION PARAMETERS

| Parameter | Value |
| --- | --- |
| $P_{txelec}$ | 50 mW |
| $P_{rxelec}$ | 50 mW |
| B (data rate) | 1 Mbps |
| $E_{tx-elec}$ | $\frac{P_{txelec}}{B} = 50$ nJ/bit |

TABLE 1-continued

RADIO SIMULATION PARAMETERS

| Parameter | Value |
|---|---|
| $E_{rx\text{-}elec}$ | $\dfrac{P_{rxelec}}{B} = 50$ nJ/bit |
| $P_{rx\text{-}thresh}$ (Rx sensitivity) | −72 dBm |
| h (antenna height) | 1.5 m |
| v (frequency band) | 916 MHz |
| λ (RF wavelength) | c/v |
| $\epsilon_{amp}$ (α = 2) | $\dfrac{16\pi^2 P_{rxthresh}}{B\lambda^2}$ J/bit/m² |
| $\epsilon_{amp}$ (α = 4) | $\dfrac{P_{rxthresh}}{B\lambda^4}$ J/bit/m² |
| $d_{xover}$ (crossover) | $\dfrac{4\lambda h^2}{\lambda} \approx 86$ m |

Figure 1A:
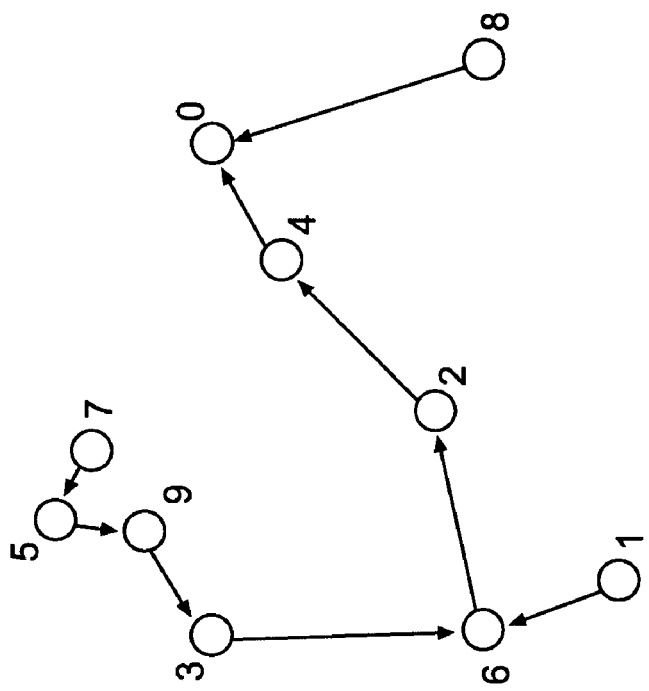
FIG. 1A illustrates a directed MEST determined without considering overhearing cost.

FIGS. 1A and 1B illustrate a scenario where nine nodes are sending data towards the base station (node 0). All of the nodes are capable of controlling their transmission power; and the intermediate nodes aggregate the data before sending it upstream towards node 0. FIG. 1A shows the case where data is transmitted along a directed MEST, i.e., ignoring overhearing cost. When node 3 forwards a packet to node 6, its transmission is overheard by nodes 5, 7 and 9. This results in unnecessary energy expenditure at the latter nodes which cannot be prevented altogether. However, if data is transmitted along a directed MOEST, as shown in FIG. 1B, this unnecessary expenditure is minimized. While there are 8 redundant overhearing transmissions in the former case, there are only 5 such transmissions in the latter case. Where the energy savings due to fewer overhearings are greater than the extra transmission energy cost, MOEST will yield a lower total energy expenditure than MEST.

Figure 5:
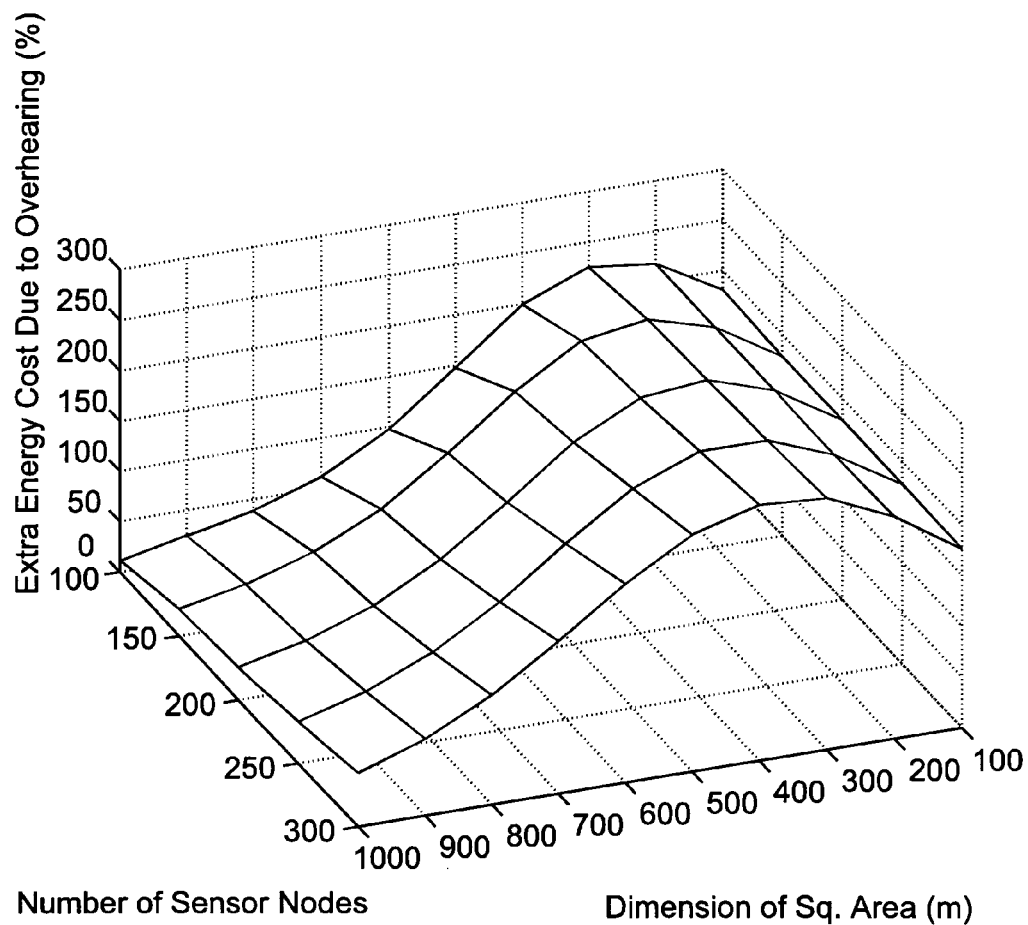
FIG. 5 illustrates the additional energy cost due to overhearing along a MEST.

FIG. 5 illustrates the extra costs due to overhearing if data is gathered from a given number of uniformly distributed sensors towards a base station along a tree calculated according to MEST. The additional cost is plotted as a percentage of the base energy cost, including transmission cost, but ignoring idle energy cost. As shows in FIG. 5, the overhearing cost can be very high in dense networks (up to approximately 300% greater than the base energy cost).

Table 2 presents the results of a comparison of MEST and MOEST for several values of N nodes uniformly distributed over a 0.25 km² area.

TABLE 2

COMPARISON OF DATA GATHERING ENERGY COSTS
WITH UNIFORMLY DISTRIBUTED NODES

| N | cost (MEST) J/bit | cost (MOEST) J/bit | % Gain MOEST:MEST |
|---|---|---|---|
| 50 | 0.66288 × 10⁻⁵ | 0.64324 × 10⁻⁵ | 2.96 |
| 100 | 1.34579 × 10⁻⁵ | 1.29657 × 10⁻⁵ | 3.66 |
| 200 | 2.71298 × 10⁻⁵ | 2.61901 × 10⁻⁵ | 3.46 |
| 300 | 4.07797 × 10⁻⁵ | 3.92669 × 10⁻⁵ | 3.71 |
| 400 | 5.4402 × 10⁻⁵ | 5.24448 × 10⁻⁵ | 3.60 |

The costs presented in Table 2 correspond to the total energy expenditure for MEST and MOEST tree construction. MOEST shows gains of less than 4% over MEST in the uniform density cases illustrated.

Non-uniform topologies were simulated in the following manner: first k points, corresponding to k clusters in a network, were generated with coordinates drawn from a uniform distribution; then N points were randomly generated within a cluster radius of these cluster centers (20 m, in these simulations). For low values of k, the network is highly non-uniform; but as k approaches N, the non-uniformity vanishes.

Figure 6A:
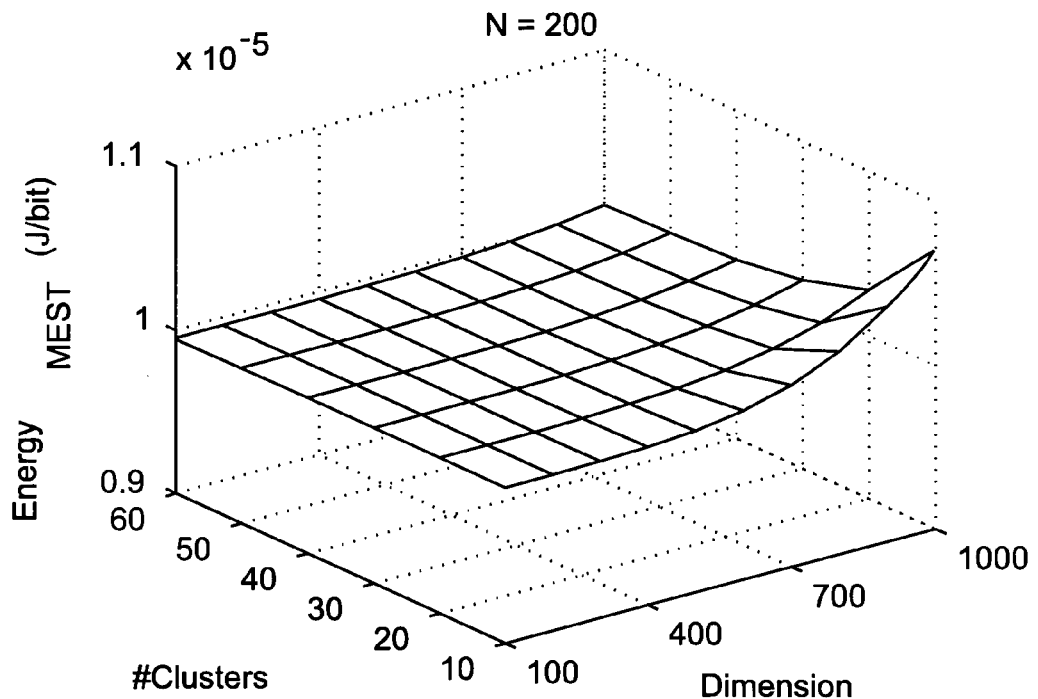
FIG. 6A illustrates the energy consumption for data gathering trees of different densities constructed according to MEST.

FIG. 6A plots the variation in the total cost of MEST with area and degree of clustering for N=200 and a cluster radius of 20 m. The increase in area is more gradual for high k than for low k (corresponding to a high degree of clustering). At low k, the distance between clusters increases more rapidly with area and the transmission cost along the edges connecting the clusters begins to dominate.

Figure 6B:
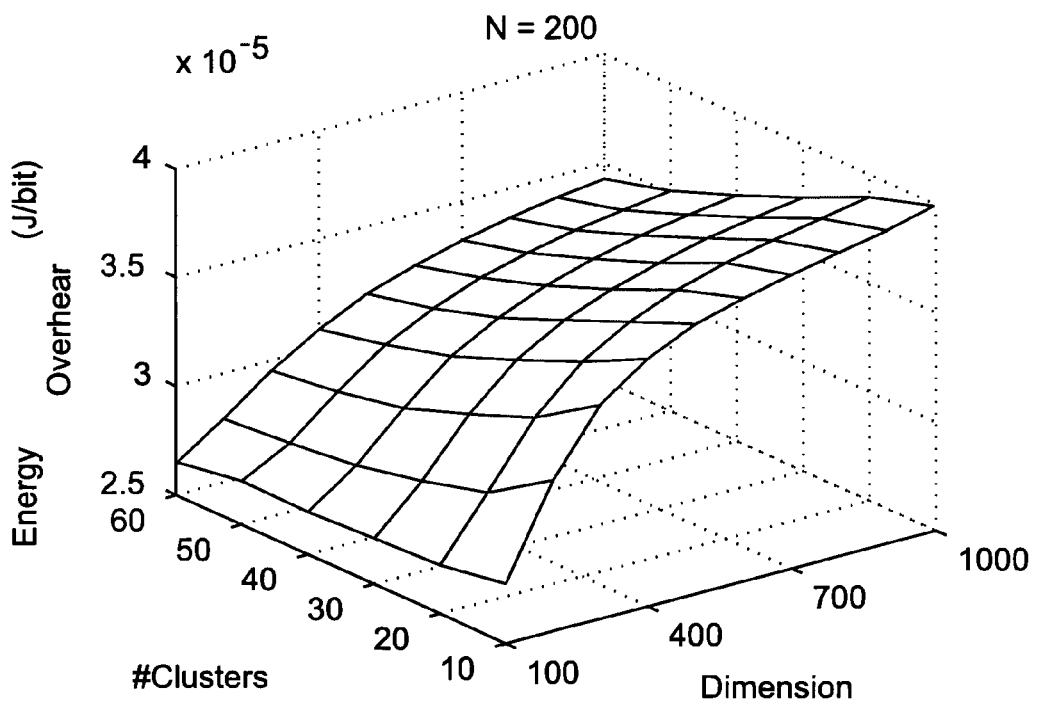
FIG. 6B illustrates the overhearing energy cost for data gathering trees of different densities constructed according to MEST.

When the network is very dense (200 nodes in 0.1 km² area), receiver costs tends to dominate and hence cost(MEST) is unaffected by a variation in k. However when the area is increased, the cost of transmission along the edges connecting the clusters tends to dominate the receiver costs. It is known that the cost of a minimum spanning tree of random graphs with power-weighted edges (i.e., where the edge cost is of the form r, where r is the Euclidean length of the edge and β is a quantity greater than 1) diminishes as N increases. Hence, as k increases, the sum of costs of the edges connecting the k clusters decreases and thus cost(MEST) decreases as well. This is because the cost of edges connecting the k clusters dominates the total cost. For similar reasons, the overhearing cost increases with both area and degree of clustering, as shown in FIG. 6B.

Figures 7A, 7B, 7C:
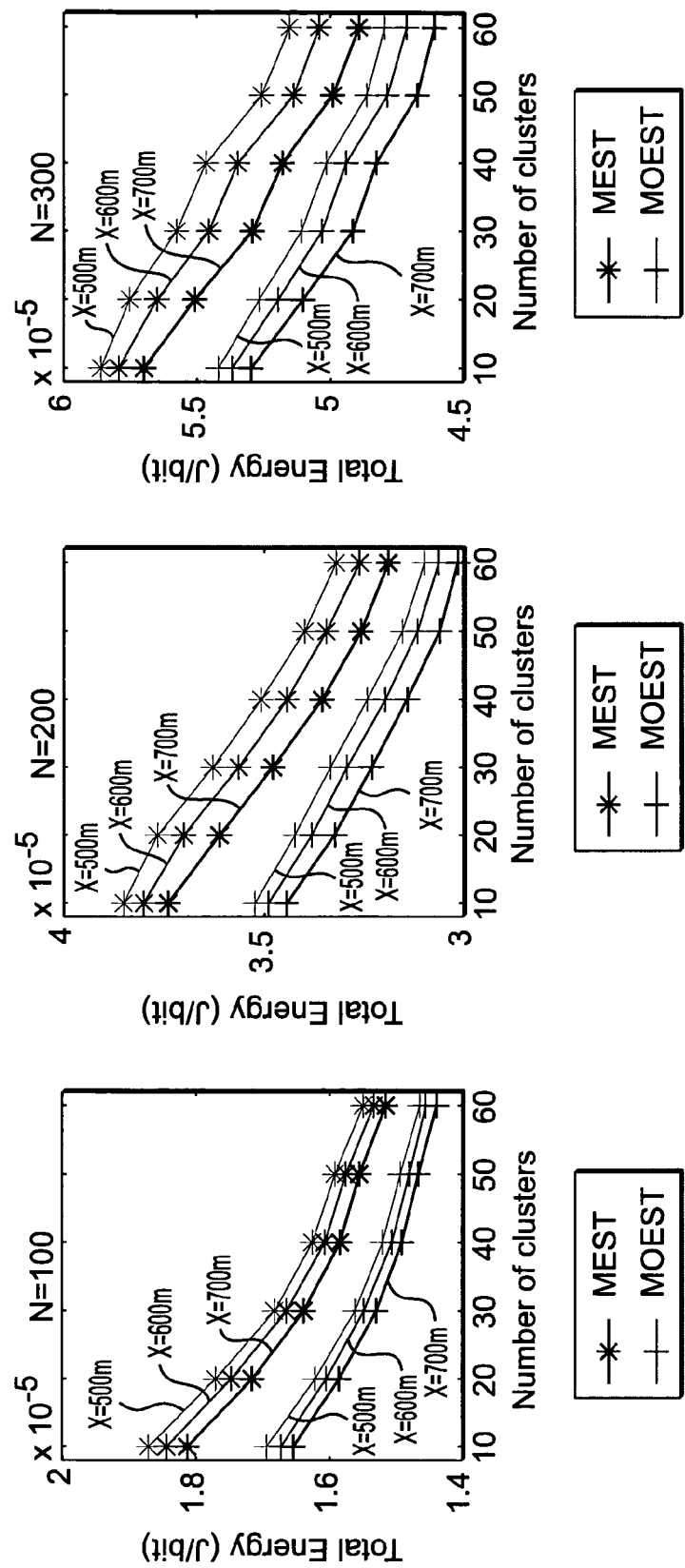
FIGS. 7A-7C illustrate the total energy consumption for data gathering trees of different densities and constructed according to different cost models.

FIGS. 7A-7C are similar graphs comparing the total energy expenditure (transmission, electronics and overhearing reception) due to MEST and MOEST with respect to the number of clusters for several values of N. Representative results for 500×500, 600×600 and 700×700 areas are shown. As shown, MOEST outperforms MEST in this metric in all scenarios. Gains of up to almost 10% are observed. Such gains are significant for low power sensor networks which are designed to operate for as long as possible. For all N, the absolute gains of MOEST over MEST are maximum for low k and diminish gradually as k increases. This is because there is a greater degree of overhearing for highly clustered networks and hence the energy savings yielded by MOEST are more significant.

Figure 8A:
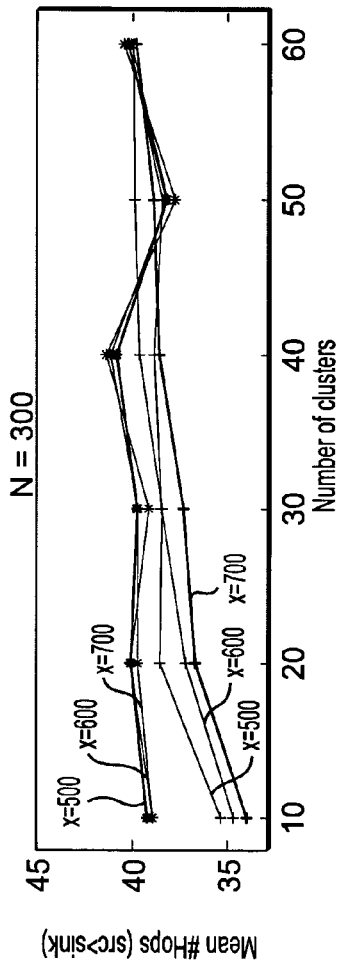
FIGS. 8A-8C illustrate the average hop counts for data gathering trees of different densities and constructed according to different cost models.
Figure 8B:
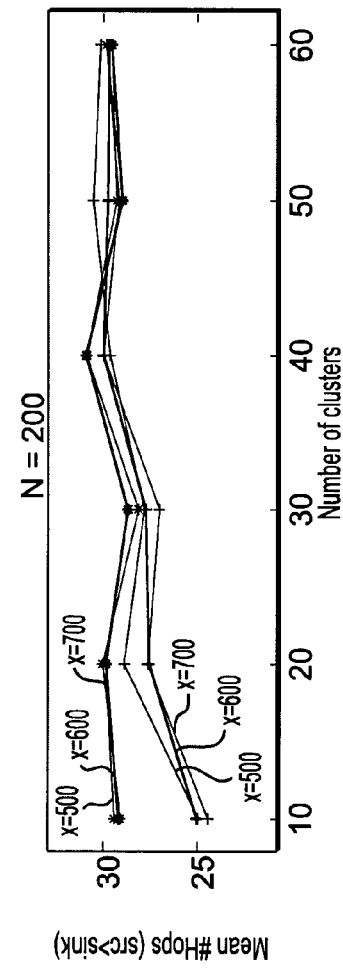
Figure 8C:
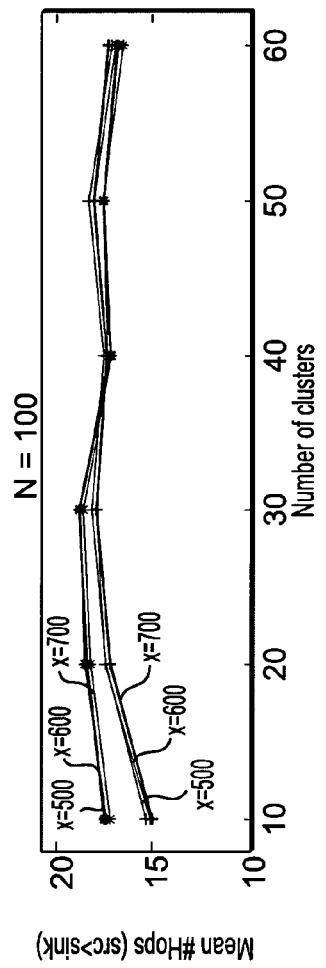

FIGS. 8A-8C are similar graphs comparing mean number of hops yielded by MEST and MOEST with respect to the number of clusters for several values of N. FIGS. 8A-8C show that source to sink path lengths are not significantly affected by MOEST. In fact, for low k, MOEST yields average path lengths that are shorter than MEST. Consequently, aggregated packets will not suffer greater hop delays if overhearing cost are included in the energy equation.

Data Dissemination

Systems, methods and computer readable media consistent with the present invention provide mechanisms for minimizing a data dissemination energy cost within a wireless network having a plurality of nodes, including a plurality of transmitting nodes and a plurality of receiving nodes, wherein the dissemination energy cost includes at least an overhearing cost. Exemplary embodiments of the present invention minimize a dissemination energy cost by determining a transmission power assignment that will minimize the total energy cost of the transmission.

Exemplary embodiments of the present invention employ known algorithms for determining the transmission power assignment that will minimize the dissemination energy cost of a transmission. The presently preferred algorithm is Embedded Wireless Multicast Advantage (EWMA), which was proposed by M. Cagalj, J.-P. Hubaux, and C. Enz, "Energy-efficient Broadcasting in All-wireless Networks,"

ACM/Kluwer Journal of Mobile Networks and Applications (MONET), April 2003, which is hereby incorporated by reference in its entirety. Although the EWMA algorithm is presently preferred, the present invention is not limited to any particular algorithm and one of ordinary skill will recognize that other suitable algorithms, such as those proposed by Wieselthier et al. (incorporated by reference above), may be employed.

Figure 9:
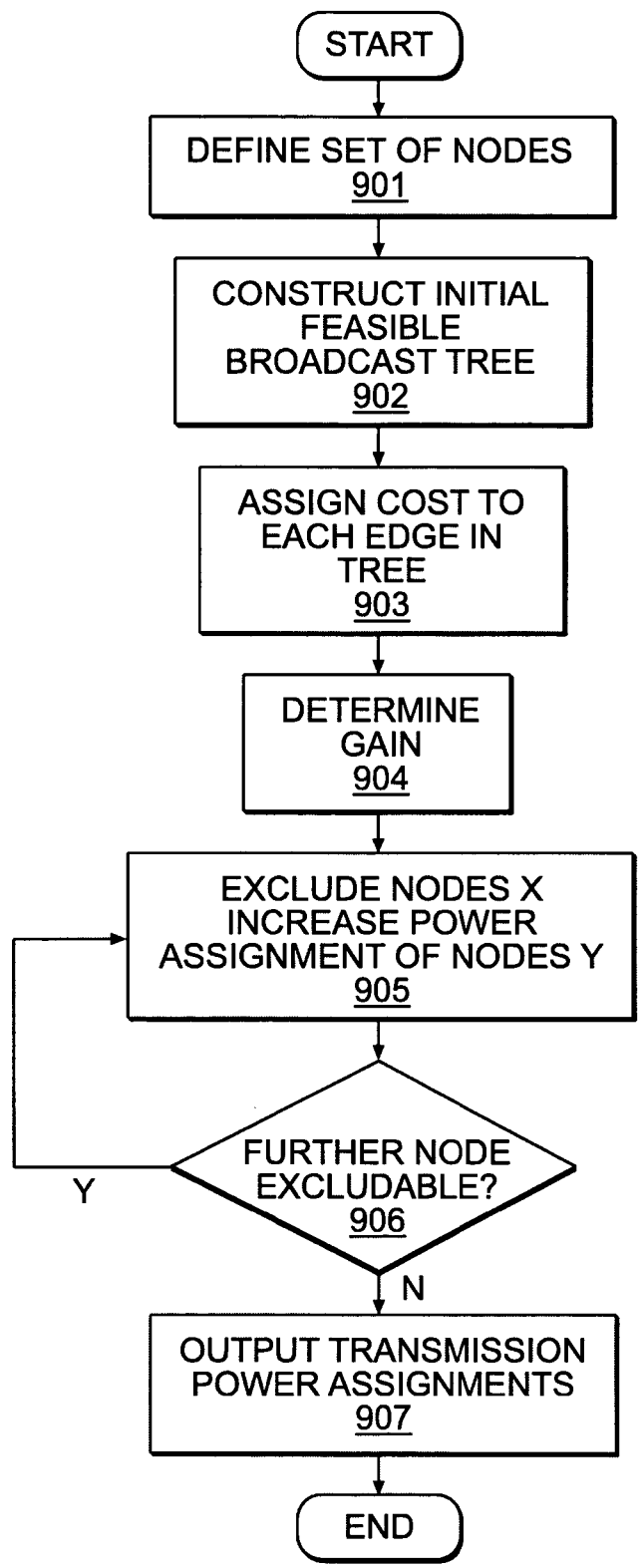
FIG. 9 is a flow chart that illustrates an exemplary method (EWMA) for minimizing total dissemination energy.

FIG. 9 is a flow diagram which illustrates an exemplary method of minimizing total dissemination energy utilizing the EWMA algorithm.

At 901, a set of sensor nodes is defined. The set may be defined by the coordinates of the nodes in space (in either two or three dimensions). Advantageously, the set of nodes may also be defined in time, e.g., to account for intelligent cycling of low-power sensor radios to save energy.

At 902, an initial feasible broadcast tree, i.e., a broadcast tree that will allow reception by all intended recipients, is constructed. MEST may advantageously be employed to construct this initial broadcast tree.

At 903, an energy cost for each edge in the broadcast tree is determined and assigned. Although known algorithms ignore overhearing cost, systems, methods and computer readable media consistent with the present invention incorporate an overhearing cost when assigning an energy cost, although other factors may be included. In exemplary embodiments of the present invention, the energy cost is calculated by a method using Equation 5 above.

At 904, the total energy cost gain for each node in the broadcast tree is determined.

At 905, increased gain is attempted. Specifically, gain is achieved by excluding one node x from the broadcast tree at the expense of increasing the transmission power assignment for another node y. Thus, at 905, a node x is excluded from the broadcast tree and the transmission power assignments of another node y is increased.

The method iteratively attempts to increase the gain at 905 until it is determined, at 906, that no other node can be excluded from the broadcast tree without leaving some node uncovered by a transmitting node. Essentially, some edges of the initial broadcast tree are replaced with new edges in order to systematically reduce the energy cost, while ensuring that nodes which were previously reachable only through an excluded node are reachable in the modified tree.

If no other node can be excluded, then processing continues to 907. At this point, the total energy cost, including the overhearing cost, of the broadcast tree is minimized.

At 907, the transmission power assignment for each node is output.

Data Dissemination Results

Figure 10C:
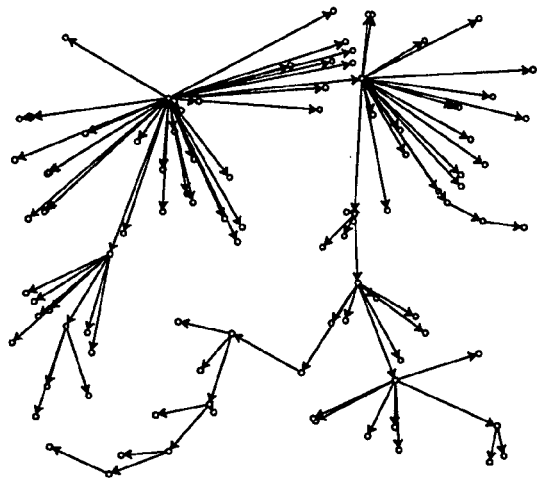
FIG. 10C shows a tree for the same network as in FIGS. 10A and B, but constructed by considering the overhearing cost along with both the transmission and reception costs.
Figure 10B:
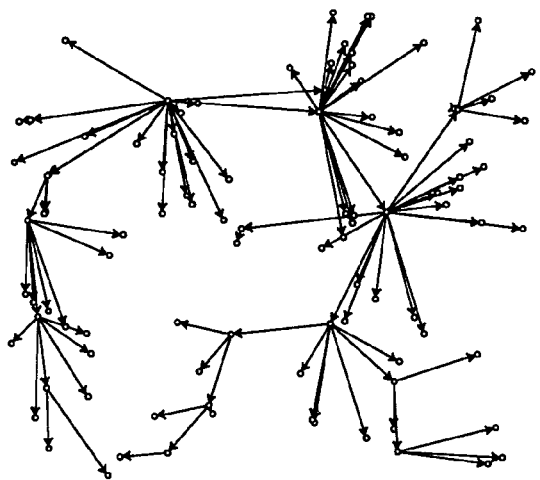
FIG. 10B shows a tree for the same network as in FIG. 10A, but constructed by considering both the transmission and reception costs.
Figure 10A:
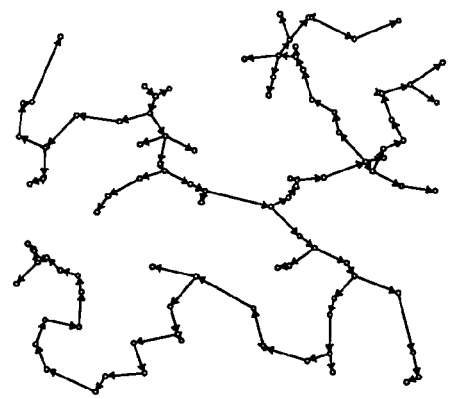
FIG. 10A shows a tree constructed for an exemplary network by considering only the transmission cost.

By incorporating overhearing cost into the energy cost metric, systems, methods and computer readable media consistent with the present invention construct broadcast trees which differ significantly from broadcast trees constructed without consideration of these costs. FIGS. 10A-10C illustrate the effect of using different energy cost models on the structure of broadcast trees generated by EWMA.

FIG. 10A shows a tree constructed for an exemplary network by considering only the transmission cost. The EWMA algorithm employs a relatively large number of transmitters with minimal transmission power assignments in this scenario.

FIG. 10B shows a tree for the same network as in FIG. 10A, but constructed by considering both the transmission and reception costs. In response, EWMA reduces the number of transmitting nodes since a large number of transmissions is deemed expensive in this model. This results in some nodes having to increase their transmission power and cover the excluded nodes, thus giving the tree a bushy appearance.

FIG. 10C shows a tree for the same network as in FIGS. 10A and B, but constructed by an exemplary embodiment of the present invention in which the overhearing cost was considered along with both the transmission and reception costs. As shown in FIG. 10C, when the overhearing cost is included in the total dissemination cost, the resulting tree is bushier near the root node but less so at forwarding nodes at lower levels. This is because a tree with a number of low degree forwarding nodes at lower levels expends less energy due to overhearing than a tree having similar degree forwarding nodes at all levels (which is the case for FIG. 10B). The non-uniform degree structure achievable by systems, methods and computer readable media consistent with the present invention minimizes redundant overhearing costs at other nodes.

Figures 11A, 11B, 11C:
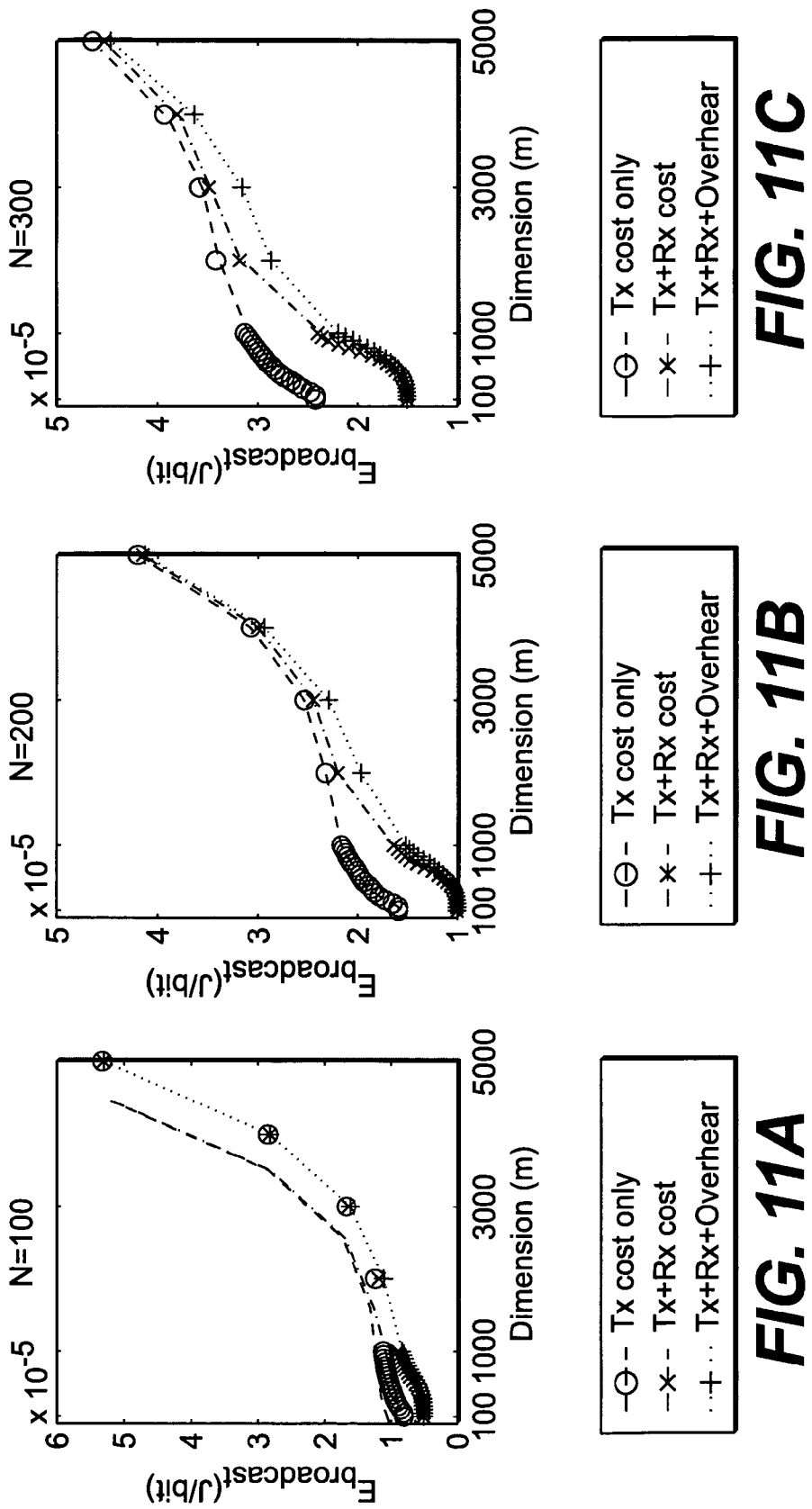

FIGS. 11A-11C plot the total energy consumed to broadcast a bit of data for the same three energy cost models (Tx; Tx+Rx; and Tx+Rx+overhearing) for N=100 (FIG. 11A), N=200 (FIG. 11B), and N=300 (FIG. 11C). Simulation parameters remain as given in Table 1. The graphs for each of these cost models are wavy in general shape, i.e., they have regimes of sharp increase followed by gentle increase and then sharp increase again. For the densest networks (dimension around 100 m), the reception cost dominates the energy equation and the depth of the broadcast tree is 1 for the Tx+Rx and Tx+Rx+overhearing energy cost models. Consequently, the curves are mostly flat. As the network gets slightly sparser (dimension between 500 m and 1000 m), the depth of the broadcast tree increases to a few hops, which results in a sharp increase in energy costs in these latter two models. This is the regime where overhearing cost starts to become a major factor.

As the network becomes sparser (dimension between 1000 m and 3000 m), reception and overhearing costs are comparable to the propagation energy costs and the trees are less bushy. Hence a slight increase in area does not result in a significant increase in energy. However, there is a sharp increase in costs as the network becomes very sparse (3000 m-5000 m) because transmission cost is the dominant factor in that regime. The broadcast trees are not at all bushy for such sparse networks.

Figures 12A, 12B, 12C:
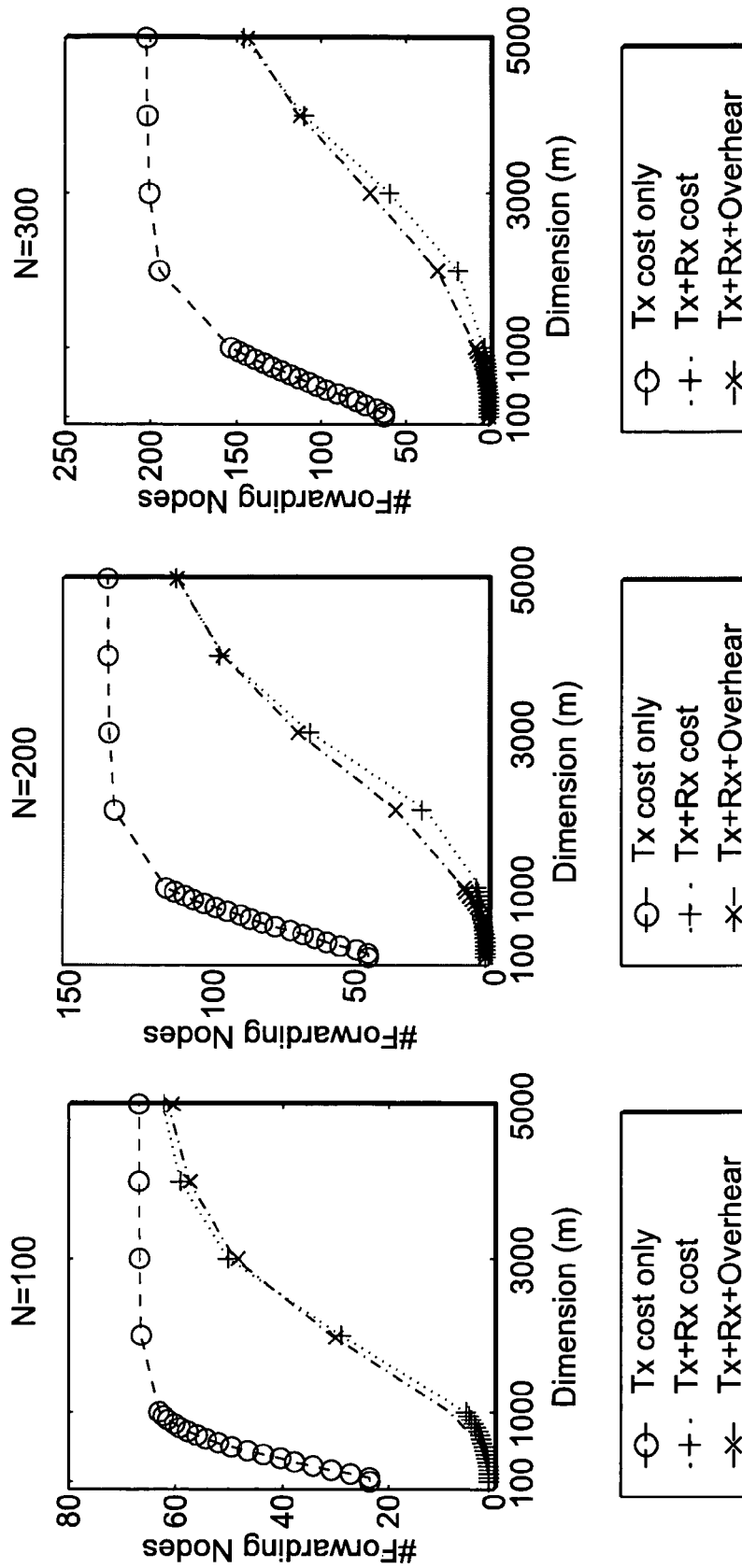
FIGS. 12A-12C show the number of nodes forwarding packets for broadcast trees of different densities and constructed according to different cost models.

The gains of factoring in reception and overhearing costs are maximum for dense networks and these increase in absolute value as N is increased. This is because, for dense networks, all nodes can be covered with only a few broadcasts. FIGS. 12A-12C show how the number of forwarding nodes increases with area for N=100 (FIG. 12A), N=200 (FIG. 120B), and N=300 (FIG. 12C). Much fewer nodes participate in forwarding broadcast packets if reception and/or overhearing cost is included in the model. There are slightly more forwarding nodes in the Tx+Rx+overhearing cost model than in the Tx+Rx cost model.

Figure 13A:
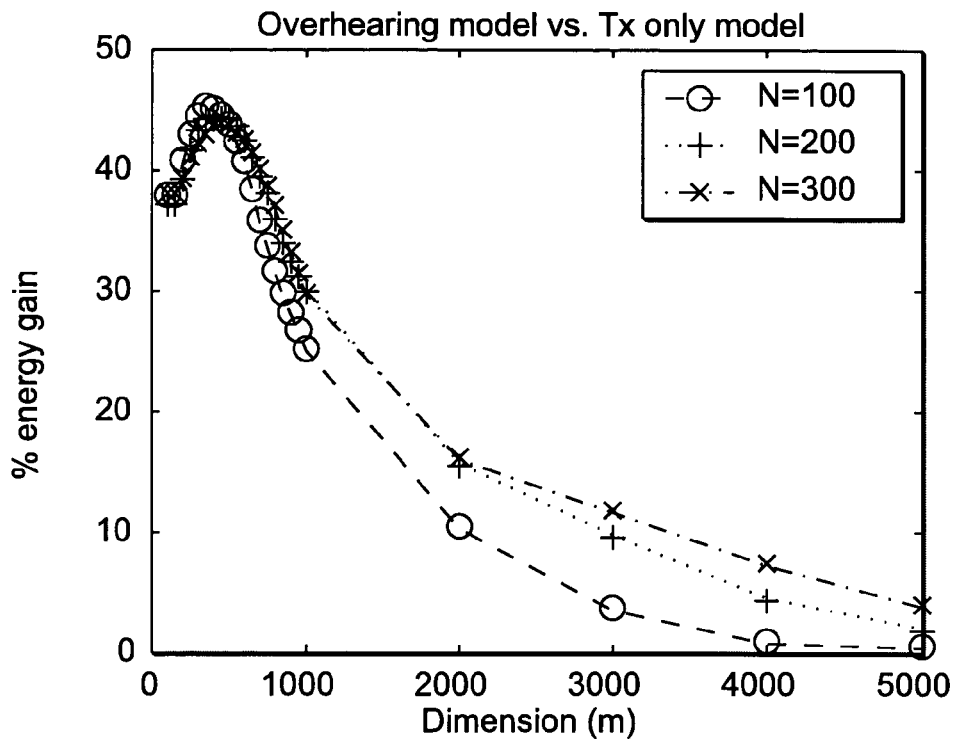
FIGS. 13A and 13B illustrate the energy gain of exemplary embodiments of the present invention (dissemination case) according to different cost models.
Figure 13B:
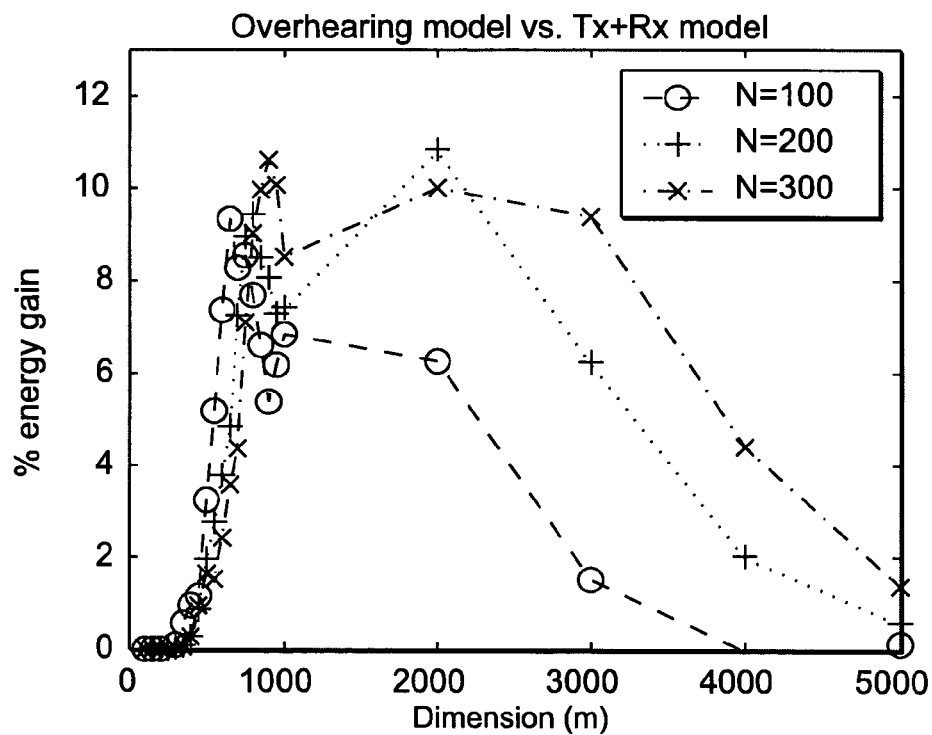

The gains of using the overhearing cost model over models which do not capture that cost are further illustrated in FIGS. 13A and 13B. The highest percentage gains can be observed around the 1 $km^2$ region. Incorporating overhearing as well as reception cost into the energy equation can save as much as 45% of the total energy cost in those regimes. The Tx+Rx+overhearing cost model yields gains of over 10% above the Tx+Rx energy model in dense networks (N=300; dimensions around 1000 m).

The energy gains achievable with systems, methods and computer readable media consistent with the present invention come at the expense of other metrics. The broadcast trees yielded by exemplary embodiments of the present invention are more likely to be very bushy and thus less reliable as the burden of forwarding the packet is shared by only a small fraction of the nodes. It is the duty of the system designer to analyze the requirements of the task and balance these tradeoffs. If reliability in broadcast is more desirable than total energy savings, a sparse tree may be more suitable than a bushy one.

Exemplary System and Computer Readable Media

Figure 14:
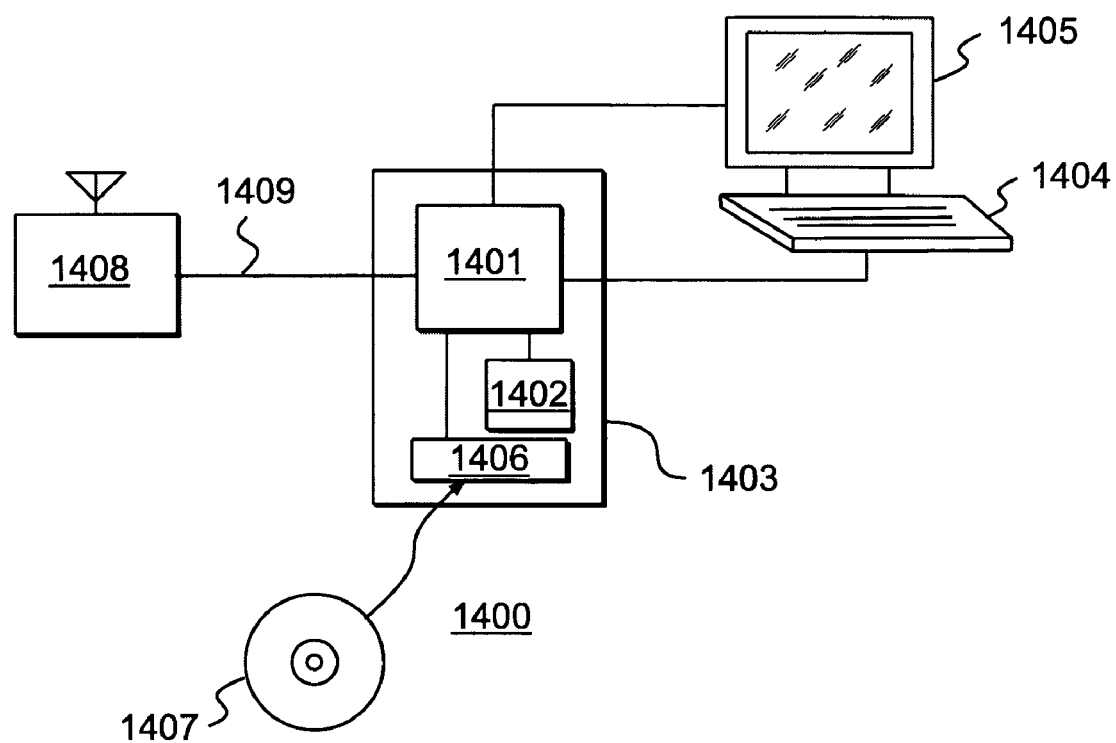
FIG. 14 shows exemplary embodiments of a system and computer readable medium consistent with the present invention.

FIG. 14 shows an exemplary system 1400 consistent with the present invention. As shown, such a system 1400 comprises a processor 1401 that may be configured to perform one or more of the above methods. Processor may be linked to a memory 1402, such as RAM or ROM memory. Memory 1402 may contain instructions or data for performing one or more of the above methods. Processor 1401 may be contained in a computer 1403, such as a personal computer, workstation, network computer or mainframe computer. Computer 1403 may include a user input device 1404, such as a mouse or keyboard, and an output device 1405, such as a display or printer. Computer 1403 may also advantageously include an interface 1406, such as a disk drive, for a computer readable medium 1407.

Consistent with the present invention, computer readable medium 1407 is any type of medium that is capable of configuring a user device, such as processor 1401, to perform methods consistent with the present invention. Computer readable medium 1407 may be, e.g., an optical medium (such as an optical disk), a magnetic medium (such as a magnetic disk or tape), a physical medium (such as punch cards, paper tape), or any other memory chip, cartridge or carrier wave which a computer may read. Computer readable medium 1407 may be encoded with or otherwise carry instructions for configuring the processor 1401 to perform one or more of the above methods. Computer readable medium may also contain data used in the performance of such methods. Interface 1406 may be used to copy or transfer instructions from computer readable medium 1407 into memory 1402 for later execution by processor 1401.

Advantageously, processor 1401 may be linked to one or more nodes 1408 in a wireless network, such as a base station node, via a communications channel 1409. Communications channel 1409 may itself be wireless. Alternatively, communications channel 1409 may be a wired channel, such as an optical fiber, a telephone line, or the Internet. An output of the processor 1401, e.g., a transmission power assignment, may then be transferred from the processor 1401 to the node 1408 over communications channel 1409 for use according to one or more of the above methods.

CONCLUSION

Systems, methods and computer readable media consistent with the present invention may require knowledge of the state of all links in the network. Exemplary embodiments of the present invention may be implemented without modification in networks that use distributed databases of topology information such as link state style protocols. See, e.g., T. Clausen, P. Jacquet, A. Laouiti, P. Minet, P. Muhlethaler, A. Qayyum, and L. Viennot, "Optimized Link State Routing Protocol," RFC 3626 (Experimental), October 2003, and R. Ogier, F. Templin, and M. Lewis, "Topology Dissemination Based on Reverse-Path Forwarding (TBRPF)," RFC 3684 (Experimental), February 2004, both of which are hereby incorporated by reference in their entirety.

Alternatively, exemplary embodiments of the present invention may be implemented with modification and some loss of performance in protocols which distribute more limited sets of network information such as HSLS. See, e.g., C. Santivanez, S. Ramanathan, and I. Stavrakakis, "Making Link State Routing Scale for Ad Hoc Networks," *Proc. ACM MobiHoc*, Long Beach, Calif., October 2001, which is hereby incorporated by reference in its entirety.

Other embodiments of the invention will be apparent to those skilled in the art from consideration of the specification and practice of the invention disclosed herein. While exemplary methods of the present invention have been described as a series of acts, the order of the acts may vary in other implementations consistent with the present invention. Non-dependent acts may be performed in parallel. It is intended that the specification and examples be considered as exemplary only, with a true scope and spirit of the invention being indicated by the following claims.

What is claimed is:

1. A method for minimizing an energy cost within a wireless network having a plurality of nodes, including a plurality of transmitting nodes and a plurality of receiving nodes, comprising:
    determining an energy cost of a gathering of data from a plurality of nodes u to a single node v, wherein the energy cost includes at least an overhearing cost, the overhearing cost consisting of an unnecessary expenditure of energy by unintended receiving nodes receiving redundant information;
    adjusting a transmission power assignment of a transmitting node; and
    repeating the determining and adjusting to reduce a total energy cost,
wherein determining the energy cost further comprises determining a directed minimum-cost in-arborescence rooted at node v; and
wherein determining the directed minimum-cost in-arborescence comprises:
    constructing a directed graph of the network, wherein the weight of each edge in the graph corresponds to the energy cost;
    reversing the direction of each edge in the graph;
    reversing the sign of the weight for each edge in the graph;
    removing all incoming edges from node v;
    determining the maximum-cost out-arborescence rooted at node v;
    reversing the direction of each edge in the arborescence; and
    reversing the sign of the weight for each edge in the arborescence.

2. A method for minimizing an energy cost within a wireless network having a plurality of nodes, including a plurality of transmitting nodes and a plurality of receiving nodes, comprising:
    determining an energy cost of a gathering of data from a plurality of nodes u to a single node v, wherein the energy cost includes at least an overhearing cost, the overhearing cost consisting of an unnecessary expenditure of energy by nodes receiving that data that are not required to transmit that data to node v;
    adjusting a transmission power assignment of a transmitting node; and
    repeating the determining and adjusting to reduce a total energy cost.

3. The method of claim 2, wherein determining the energy cost further comprises determining a directed minimum-cost in-arborescence rooted at node v.

4. The method of claim 3, wherein determining a directed minimum-cost in-arborescence comprises finding an arborescence such that outdegree(v)=0 and for each node u, outdegree(u)=1.

5. The method of claim 3, wherein determining a directed minimum-cost in-arborescence comprises:
constructing a directed graph of the network, wherein the weight of each edge in the graph corresponds to the energy cost;
reversing the direction of each edge in the graph;
reversing the sign of the weight for each edge in the graph;
removing all incoming edges from node v;
determining the maximum-cost out-arborescence rooted at node v;
reversing the direction of each edge in the arborescence; and
reversing the sign of the weight for each edge in the arborescence.

6. A method for minimizing an energy cost within a wireless network having a plurality of nodes, including a plurality of transmitting nodes and a plurality of receiving nodes, comprising:
determining an energy cost of a dissemination of data from a single node to a plurality of nodes, wherein the energy cost includes at least an overhearing cost, the overhearing cost consisting of an unnecessary expenditure of energy by nodes receiving the transmitted data redundantly;
adjusting a transmission power assignment of a transmitting node; and
repeating the determining and adjusting to reduce a total energy cost.

7. The method of claim 6, wherein determining the energy cost comprises constructing an initial broadcast tree.

8. The method of claim 7, wherein constructing an initial broadcast tree comprises constructing a Minimum Energy Spanning Tree (MEST).

9. The method of claim 7, wherein adjusting a transmission power assignment comprises:
increasing a transmission power assignment for one node in the initial broadcast tree; and
excluding another node from the initial broadcast tree; and
repeating the increasing and excluding stages until no node can be excluded from the broadcast tree without leaving some node unreachable by any transmitting node.

10. The method of claim 6, wherein adjusting a transmission power assignment comprises performing the Embedded Wireless Multicast Advantage (EWMA) algorithm.

11. The method of claim 1, 2, or 6, wherein the energy cost further includes at least one of: a transmission energy cost; a reception energy cost; and an idle energy cost.

12. The method of claim 1, 2, or 6, wherein the wireless network is a sensor network.

13. A computer-readable medium capable of configuring a user device to perform a method for minimizing an energy cost within a wireless network having a plurality of nodes, including a plurality of transmitting nodes and a plurality of receiving nodes, the method comprising:
determining an energy cost of a gathering of data from a plurality of nodes u to a single node v, wherein the energy cost includes at least an overhearing cost, the overhearing cost consisting of an unnecessary expenditure of energy by unintended receiving nodes receiving redundant information;
adjusting a transmission power assignment of a transmitting node; and
repeating the determining and adjusting to reduce a total energy cost
wherein determining the energy cost further comprises determining a directed minimum-cost in-arborescence rooted at node v; and
wherein determining the directed minimum-cost in-arborescence comprises:
constructing a directed graph of the network, wherein the weight of each edge in the graph corresponds to the energy cost;
reversing the direction of each edge in the graph;
reversing the sign of the weight for each edge in the graph;
removing all incoming edges from node v;
determining the maximum-cost out-arborescence rooted at node v;
reversing the direction of each edge in the arborescence; and
reversing the sign of the weight for each edge in the arborescence.

14. A computer-readable medium capable of configuring a user device to perform a method for minimizing an energy cost within a wireless network having a plurality of nodes, including a plurality of transmitting nodes and a plurality of receiving nodes, the method comprising:
determining an energy cost of a gathering of data from a plurality of nodes u to a single node v, wherein the energy cost includes at least an overhearing cost, the overhearing cost consisting of an unnecessary expenditure of energy by nodes receiving that data that are not required to transmit that data to node v;
adjusting a transmission power assignment of a transmitting node; and
repeating the determining and adjusting to reduce a total energy cost.

15. The computer-readable medium of claim 14, wherein determining the energy cost further comprises determining a directed minimum-cost in-arborescence rooted at node v.

16. The computer-readable medium of claim 15, wherein determining a directed minimum-cost in-arborescence comprises finding an arborescence such that outdegree(v)=0 and for each node u, outdegree(u)=1.

17. The computer-readable medium of claim 15, wherein determining a directed minimum-cost in-arborescence comprises:
constructing a directed graph of the network, wherein the weight of each edge in the graph corresponds to the energy cost;
reversing the direction of each edge in the graph;
reversing the sign of the weight for each edge in the graph;
removing all incoming edges from node v;
determining the maximum-cost out-arborescence rooted at node v;
reversing the direction of each edge in the arborescence; and
reversing the sign of the weight for each edge in the arborescence.

18. A computer-readable medium capable of configuring a user device to perform a method for minimizing an energy cost within a wireless network having a plurality of nodes, including a plurality of transmitting nodes and a plurality of receiving nodes, the method comprising:
determining an energy cost of a dissemination of data from a single node to a plurality of nodes, wherein the energy cost includes at least an overhearing cost, the overhearing cost consisting of an unnecessary expenditure of energy by nodes receiving the transmitted data redundantly;

adjusting a transmission power assignment of a transmitting node; and repeating the determining and adjusting to reduce a total energy cost.

19. The computer-readable medium of claim 18, wherein determining the energy cost comprises constructing an initial broadcast tree.

20. The computer-readable medium of claim 19, wherein constructing an initial broadcast tree comprises constructing a Minimum Energy Spanning Tree (MEST).

21. The computer-readable medium of claim 18, wherein adjusting a transmission power assignment comprises:

increasing a transmission power assignment for one node in the initial broadcast tree; and excluding another node from the initial broadcast tree; and repeating the increasing and excluding stages until no node can be excluded from the broadcast tree without leaving some node unreachable by any transmitting node.

22. The computer-readable medium of claim 18, wherein adjusting a transmission power assignment comprises performing the Embedded Wireless Multicast Advantage (EWMA) algorithm.

23. The computer-readable medium of claim 13, 14, or 18, wherein the energy cost further includes at least one of: a transmission energy cost; a reception energy cost; and an idle energy cost.

24. A system for minimizing an energy cost within a wireless network having a plurality of nodes, including a plurality of transmitting nodes and a plurality of receiving nodes, the system comprising:

a processor configured to:

determine an energy cost, wherein the energy cost includes at least an overhearing cost, the overhearing cost consisting of an unnecessary expenditure of energy by unintended receiving nodes receiving redundant information;

adjust a transmission power assignment of a transmitting node; and repeat the determining and adjusting to reduce a total energy cost.

25. A system for minimizing an energy cost within a wireless network having a plurality of nodes, including a plurality of transmitting nodes and a plurality of receiving nodes, the system comprising:

a processor configured to:

determine an energy cost, wherein the energy cost includes at least an overhearing cost, the overhearing cost consisting of an unnecessary expenditure of energy by unintended receiving nodes receiving redundant information;

adjust a transmission power assignment of a transmitting node; and repeat the determining and adjusting to reduce a total energy cost, wherein the processor is further configured to determine the energy cost of a gathering of data from a plurality of nodes u to a single node v.

26. The system of claim 25, wherein the processor is further configured to determine a directed minimum-cost in-arborescence rooted at node v.

27. The system of claim 26, wherein the processor is further configured to find an arborescence such that outdegree (v)=0 and for each node u, outdegree(u)=1.

28. The system of claim 26, wherein the processor is further configured to:

construct a directed graph of the network, wherein the weight of each edge in the graph corresponds to the energy cost;

reverse the direction of each edge in the graph;

reverse the sign of the weight for each edge in the graph;

remove all incoming edges from node v;

determine the maximum-cost out-arborescence rooted at node v;

reverse the direction of each edge in the arborescence; and reverse the sign of the weight for each edge in the arborescence.

29. A system for minimizing an energy cost within a wireless network having a plurality of nodes, including a plurality of transmitting nodes and a plurality of receiving nodes, the system comprising:

a processor configured to:

determine an energy cost, wherein the energy cost includes at least an overhearing cost, the overhearing cost consisting of an unnecessary expenditure of energy by unintended receiving nodes receiving redundant information;

adjust a transmission power assignment of a transmitting node; and repeat the determining and adjusting to reduce a total energy cost, wherein the processor is further configured to determine the energy cost of a dissemination of data from a single node to a plurality of nodes.

30. The system of claim 29, wherein the processor is further configured to construct an initial broadcast tree.

31. The system of claim 30, wherein the processor is further configured to construct a Minimum Energy Spanning Tree (MEST).

32. The system of claim 29, wherein the processor is further configured to:

increase a transmission power assignment for one node in the initial broadcast tree; and exclude another node from the initial broadcast tree; and repeat the increasing and excluding stages until no node can be excluded from the broadcast tree without leaving some node unreachable by any transmitting node.

33. The system of claim 29, wherein the processor is further configured to perform the Embedded Wireless Multicast Advantage (EWMA) algorithm.

34. The system of claim 24, 25, or 29, wherein the energy cost further includes at least one of: a transmission energy cost; a reception energy cost; and an idle energy cost.

35. The system of claim 24, 25, or 29, wherein the wireless network is a sensor network.

* * * * *